United States Patent
Hu

[19]

[11] Patent Number: 6,116,624

[45] Date of Patent: Sep. 12, 2000

[54] DIRECTION-CHANGING AND POSITIONING DEVICE FOR THE HANDLE OF A BABY STROLLER

[76] Inventor: Stephen Hu, No 2, Ta-Tung Road, Hsin-Chu, Industrial Park, Taiwan

[21] Appl. No.: 09/053,891

[22] Filed: Apr. 1, 1998

[51] Int. Cl.⁷ .................................. B62B 7/06; B62B 7/04
[52] U.S. Cl. .................................. 280/47.371; 280/47.36; 280/642; 280/658; 280/650
[58] Field of Search ...................... 280/642, 638, 280/639, 38, 641, 647, 657, 658, 47.371, 47.37, 47.38, 47.36

[56] References Cited

U.S. PATENT DOCUMENTS 4,733,882  3/1988  Kassai ................................ 280/642

*Primary Examiner*—Michael Mar
*Assistant Examiner*—Hau Phan

*Attorney, Agent, or Firm*—Pro-Techtor International Services

[57] ABSTRACT

A direction-changing and positioning device for a handle of a baby stroller including: two linkages mounted separately on the handle of the baby stroller and movable upwardly and downwardly relative to the handle; two positioning seats provided respectively on the bottoms of the two linkages and can be moved upwardly by the two linkages, an upper and a lower engaging portion being provided on the upper and the lower ends of each seat; two engaging units provided respectively on both sides of the baby stroller which each is provided with an upper and a lower engaging portion on two suitable upper and lower positions on its corresponding strut, the upper engaging portions being engageable with the upper engaging portions of the positioning seats to secure the positioning seats; wherein, when the linkages are moved upwardly to move the positioning seats upwardly, the handle is pivotable for changing direction, the lower engaging portions of the positioning seats are engaged with the lower engaging portions of the engaging units to secure the positioning seats. The stroller thus is convenient and practical in changing direction and positioning.

6 Claims, 5 Drawing Sheets

DIRECTION-CHANGING AND POSITIONING DEVICE FOR THE HANDLE OF A BABY STROLLER

BACKGROUND OF THE INVENTION

1. Field of the Invention

The present invention relates to a direction-changing and positioning device for the handle of a baby stroller, and especially to such a device by which direction-changing and positioning device of the handle can be effected conveniently.

2. Description of the Prior Art

A conventional baby stroller mostly has its handle installed at the rear side thereof, therefore, a baby sitting therein and the baby stroller pusher both face front, so that the pusher is unable to look over the facial expression of the baby; and therefore, the pusher must frequently stop the baby stroller and walk to the front of the baby for taking a look, this is quite inconvenient. Moreover, the baby sitting in the baby stroller can not see the pusher, and thereby feels unsafe, the baby hence tends to cry.

A kind of conventional baby stroller of which the direction of the handle is changeable is quite welcome by customers, however, securing of the handle after direction changing is inconvenient, such inconvenience lead to unwilling of using of the user of this kind of baby stroller.

SUMMARY OF THE INVENTION

The inventor of the present invention provides after hard study the direction-changing and positioning device for the handle of a baby stroller in view of the above statement, by which, direction changing of the handle is convenient, yet the handle can be positioned easily and conveniently after direction changing.

The primary object of the present invention is to provide a direction-changing and positioning device for the handle of a baby stroller, by which, the handle can be positioned effectively and conveniently after direction changing, so that it is more practical in use.

To obtain the above stated object, the direction-changing and positioning device for the handle of a baby stroller of the present invention is installed between two struts and its handle, it renders the handle able of making positioning effectively after direction-changing thereof, it is characterized in that the direction-changing and positioning device is provided with two linkages which are mounted separately on the handle and can be moved upwardly and downwardly relatively to the handle; two positioning seats are provided respectively on the bottoms of the two linkages and can be moved upwardly by the two linkages, an upper and a lower engaging portion are provided on the upper and the lower ends of each seat; two engaging units are provided respectively on both sides of the baby stroller and each is provided with an upper and a lower engaging portion on two suitable upper and lower positions on its corresponding strut, the lower engaging portion can be engaged with the lower engaging portion of one of the positioning seats to secure the positioning seat, when the linkages are moved upwardly to move the positioning seats upwardly, the handle can be pivotted for changing direction, and the upper engaging portions of the positioning seats can thus be engaged with the upper engaging portions of the engaging units to secure the positioning seat.

In this way, the handle of the baby stroller can make a direction-changing easily, and the handle can be positioned effectively after direction changing, such operation is quite convenient.

The present invention will be apparent in its detailed technique and contents after reading the detailed description of the preferred embodiment thereof in reference to the accompanying drawings.

DETAILED DESCRIPTION OF THE PREFERRED EMBODIMENT

Figure 1:
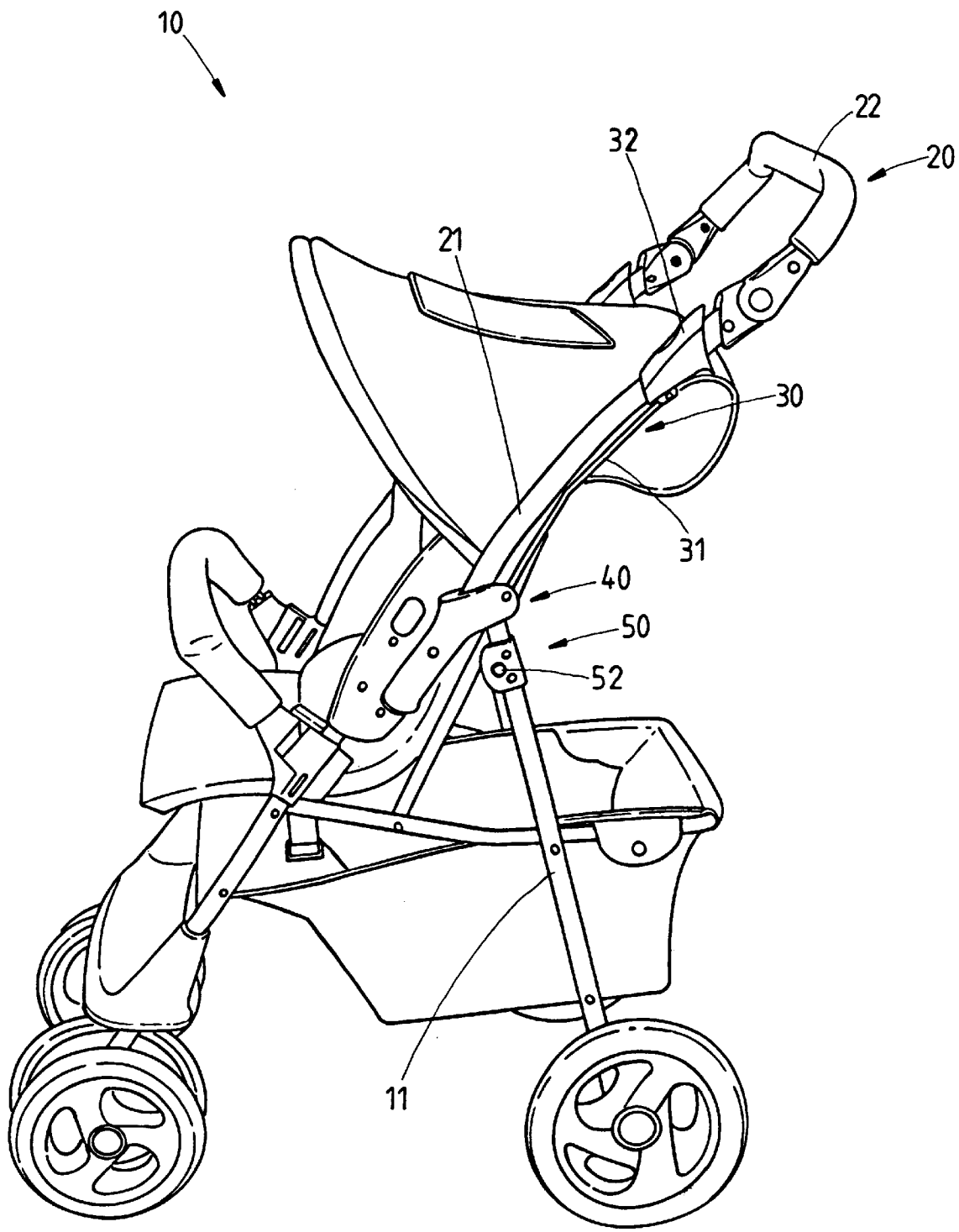
FIG. 1 is a perspective view showing the appearance of the present invention.
Figure 2:
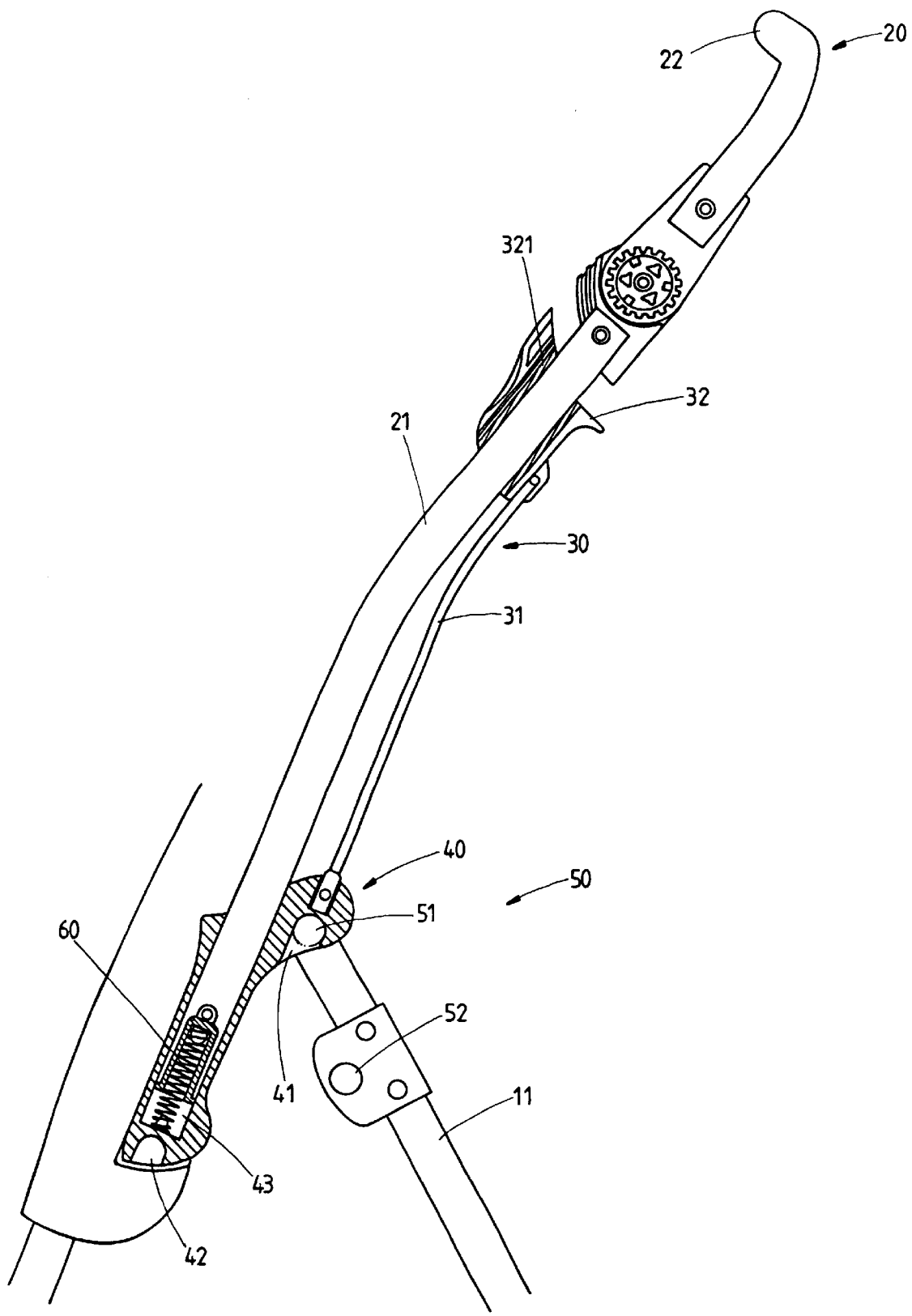
FIG. 2 is a partial sectional view of the present invention.

Referring to FIG. 1 and 2, the direction-changing and positioning device for the handle 20 of the baby stroller 10 of the present invention is installed between the struts 11 and the handle 20, it renders the handle 20 able of making positioning effectively after being direction-changed, the handle 20 is in the shape of an inverted "U" and also includes two parallel bracing rods 21 and a grasp 22, the parallel bracing rods 21 are provided on both sides of the baby stroller 10, the direction-changing and positioning device for the handle 20 is comprised of:

two linkages 30 which are mounted separately on the handle 20 of the baby stroller 10 and can be moved upwardly and downwardly relative to the handle 20, the linkages 30 each includes a link 31 and a direction-changing pulling lever 32 connected to the upper end of the link 31 and provided with a sleeve 321 sipping over the corresponding one of the two parallel bracing rods 21 for moving upwardly and downwardly on the bracing rod 21;

two positioning seats 40 provided respectively on the bottoms of the links 31 of the two linkages 30 and can be moved upwardly by the two links 31, an upper and a lower engaging portion 41, 42 are provided on the upper and the lower ends of each seat 40 (FIG. 2), in the preferred embodiment shown, the upper and lower engaging portions 41, 42 are respectively an upper and a lower engaging mouth; the positioning seats 40 are provided each with a sleeve 43 slipping over the corresponding one of the two parallel bracing rods 21 for moving on the bracing rod 21 (referring to FIG. 2);

two engaging units 50 provided respectively on both sides of the baby stroller 10 which each is provided also with an upper and a lower engaging portion 51, 52 on two suitable upper and lower positions on its corresponding strut 11, in the preferred embodiment shown, the upper and lower engaging portions 51, 52 are two stubs; the upper engaging portions 51 can be engaged with the upper engaging portions 41 of the positioning seats 40 to secure the positioning seats 40, when the direction changing pulling levers 32 of the linkages 30 are moved upwardly to move the positioning seats 40 upwardly, the handle 20 can be pivotted for changing direction, and the lower engaging portions 42 of the positioning seats 40 can thus be engaged with the lower engaging portions 52 of the engaging units 50 to secure the positioning seats 40;

two elastic restoring means 60 provided between the positioning seats 40 and the parallel bracing rods 21 of the baby stroller 10, the positioning seats 40 can restore their original down positions automatically when they are moved upwardly, the sleeves 43 of the seats 40 are slipped over the bottoms of the two parallel bracing rods 21 of the handle 20 respectively, the elastic restoring means 60 are springs, one end of each spring is fixed on the corresponding one of the seats 40, while the other end is fixed on the corresponding one of the bracing rods 21 of the handle 20, in this way, when the positioning seats 40 are moved upwardly to release the force exerting thereon, they can be pulled back by the springs, so that the positioning seats 40 are provided with elastic restoring function.

Figure 3A:
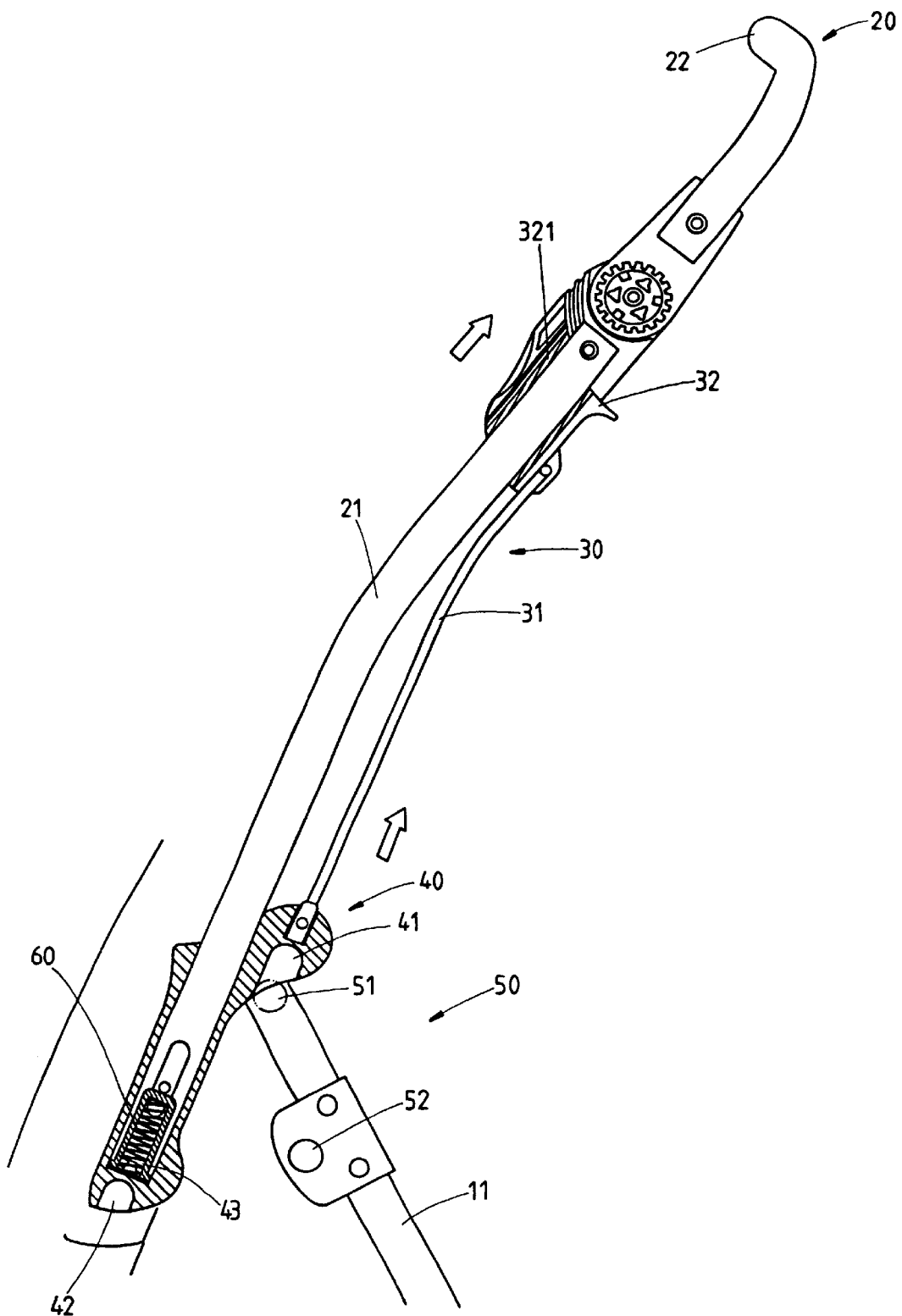
FIG. 3A is a schematic view of the present invention.
Figure 3B:
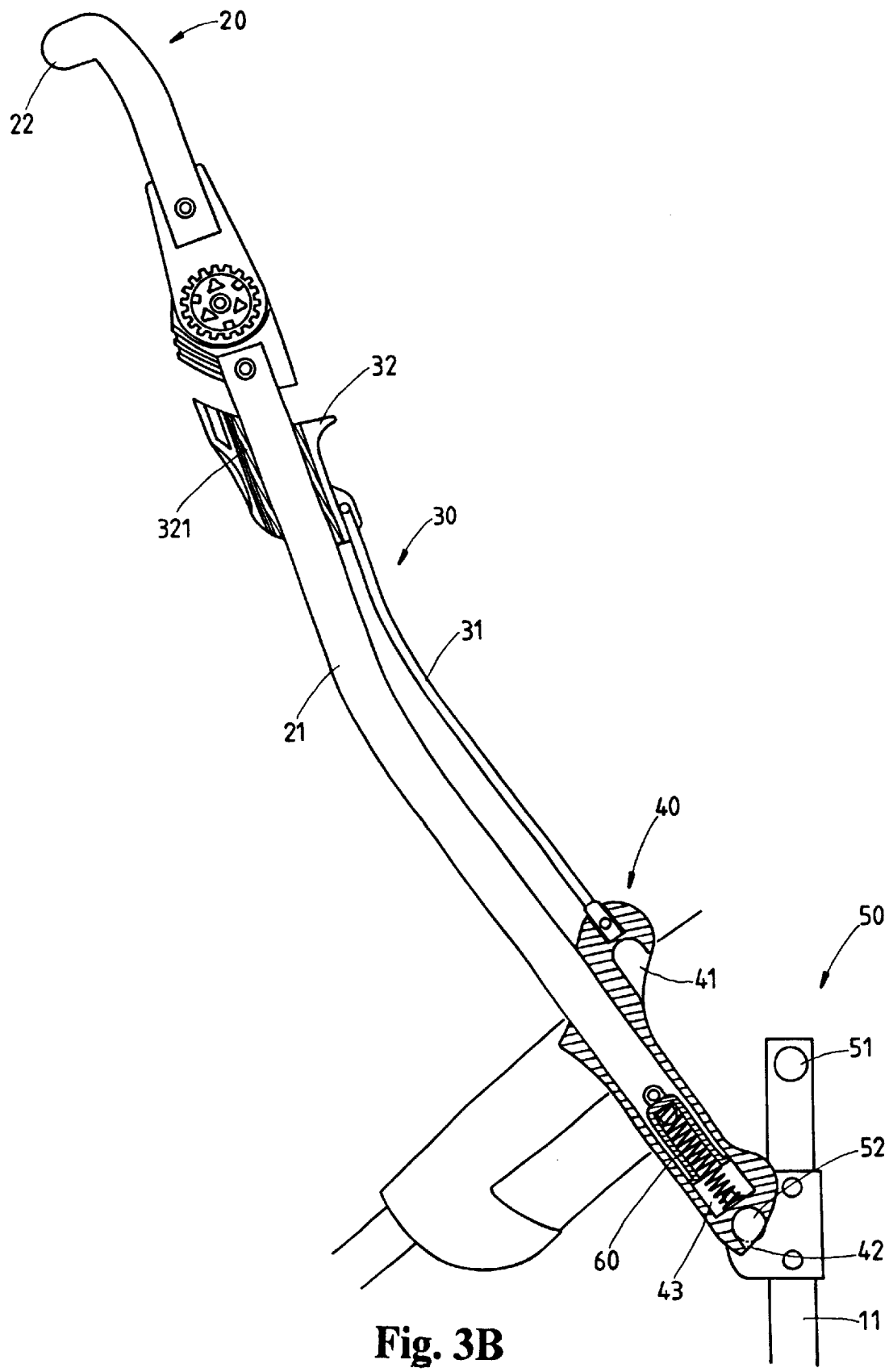
FIG. 3B is another schematic view of the present invention.

Referring FIG. 3A which is a schematic view of the present invention, when the direction-changing pulling levers 32 of the linkages 30 are activated, the positioning seats 40 are pulled upwardly by the links 31, now the upper engaging portions 41 of the positioning seats 40 get rid of engagement of the upper engaging portions 51 of the engaging units 50 to allow the handle 20 to change operating direction, this is shown in FIG. 3B.

When the handle 20 changes its operating direction, the force extering on the positioning seats 40 is released, the positioning seats 40 are thereby pulled back to their original positions by the elastic restoring means 60, and the lower engaging portions 42 of the positioning seats 40 are engaged with the lower engaging portions 52 of the engaging units 50 to allow effective and quick positioning of the handle 20 after it changes its operating direction.

Figure 4:
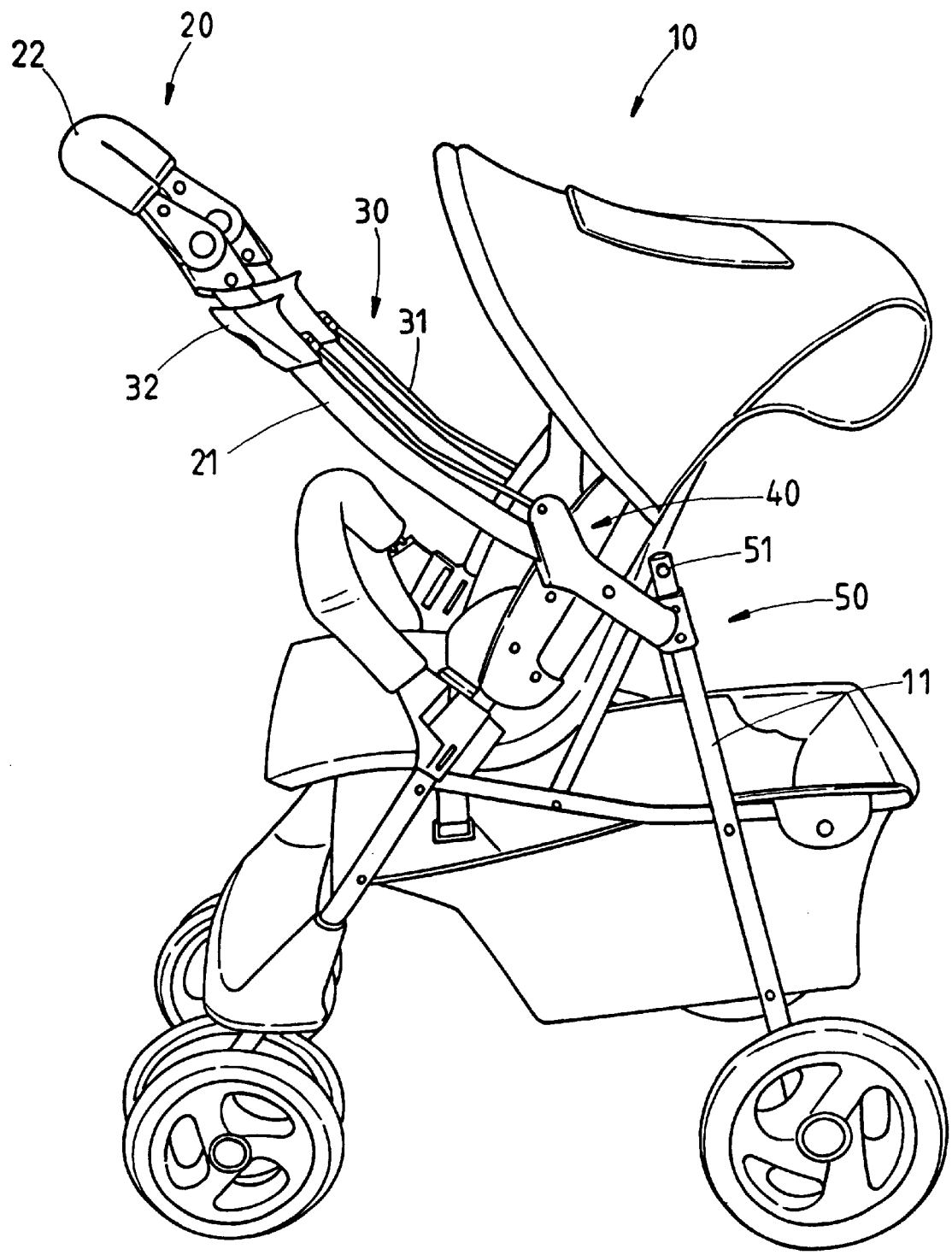
FIG. 4 shows the appearance of the stroller after direction-changing of a handle of the present invention.

Referring to FIG. 4 which shows the appearance of the stroller after direction-changing of the handle 20 of the present invention, by this embodiment, a user can change the direction for operation of the handle 20 according to his requirement, in order that the pusher of the baby stroller 10 can face to the baby in the baby stroller 10, so that the baby stroller 10 can be more practical in use.

By the above stated combination of structure, the direction-changing and positioning device for the handle 20 of the baby stroller 10 of the present invention is assured in achieving the object and the function of the present invention, thereby, the baby stroller 10 can change its direction for operation and can be effectively positioned, these make it more practical, and the industrial value thereof is increased.

Obviously, many modifications and variations of the present invention are possible in the light of the above teachings. It is therefore to be understood that within the scope of the appended claims, the invention may be practised otherwise than what is specifically described by those skilled in this art.

Having thus described my invention, what I claim as new and desire to be secured by Letters Patent of the United States is:

1. A direction changing and positioning device in combination with a handle of baby stroller, said device being installed on a stroller having a pair of laterally spaced front struts and a pair of laterally spaced rear struts, comprising:

an inverted U-shaped handle formed by two parallel bracing rods and a grip portion extending there between, the bracing rods being pivotally attached to the pair of front struts to allow the handle to pivot about a transverse axis between a first position and a reversed second position relative to the stroller;

two linkage rods mounted on respective bracing rods of said handle, the linkage rods being movable upward and downward relative to said bracing rods;

a positioning seat provided on a lower end of each of said two linkage rods, each positioning seat having upper and lower ends provided with upper and lower receiving portions respectively;

an engaging unit provided on an upper end of each one of said pair of rear struts, each said engaging unit being provided with upper and lower engaging portions at upper and lower positions respectively of each engaging unit, said upper engaging portion of said engaging units being engaged in said upper receiving portions of said positioning seats to secure said handle in said first position, and said lower engaging portions of said engaging units being engaged in said lower receiving portions of said positioning seats to secure said handle in said second position, said positioning seat being movable upward relative to said handle upon actuation by a user to release the engaging portions of the engaging unit from the respective receiving portions of the positioning seat, thereby permitting said handle to pivot between said first and second positions.

2. The direction-changing and positioning device for a handle of a baby stroller as claimed in claim 1, wherein, a direction-changing pulling lever is connected to an upper end of each said linkage rod, a bottom of said linkage rod is connected to a corresponding one of said positioning seats; such that when said direction-changing pulling levers are activated, said positioning seats are pulled upward to disengage from said upper engaging portions of said engaging units so that said handle pivots so as to change operating direction.

3. The direction-changing and positioning device for a handle of a baby stroller as claimed in claim 2, wherein, said direction-changing pulling levers are each provided with a sleeve slipping over a corresponding one of said bracing rods.

4. The direction-changing and positioning device for a handle of a baby stroller as claimed in claim 1, wherein, said upper and lower receiving portions on said positioning seats are respectively an upper and a lower engaging mouth formed respectively on the upper and the lower positions on said positioning seats, while said upper and lower engaging portions of said engaging units are respectively upper and lower stubs cooperating with said upper and lower engaging mouths.

5. The direction-changing and positioning device for a handle of a baby stroller as claimed in claim 1, wherein, elastic restoring means are provided between said positioning seats and said bracing rods of said baby stroller.

6. The direction-changing and positioning device for a handle of a baby stroller as claimed in claim 5, wherein, said positioning seats are each provided with a sleeve that slips over a corresponding one of said bracing rods, and said elastic restoring means are springs, said springs are provided in said sleeves with one end of each of said springs fixed on a corresponding one of said positioning seats and with another end fixed on a corresponding one of said bracing rods.

* * * * *